US010810673B1

(12) United States Patent
Prasad et al.

(10) Patent No.: US 10,810,673 B1
(45) Date of Patent: Oct. 20, 2020

(54) SYSTEMS AND METHODS FOR AUTOMATICALLY REALLOCATING INVESTMENT FUNDS

(71) Applicant: United Services Automobile Association (USAA), San Antonio, TX (US)

(72) Inventors: Bharat Prasad, San Antonio, TX (US); MacDonald Etugbo, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 233 days.

(21) Appl. No.: 15/410,370

(22) Filed: Jan. 19, 2017

Related U.S. Application Data

(60) Provisional application No. 62/286,171, filed on Jan. 22, 2016.

(51) Int. Cl.
*G06Q 40/06* (2012.01)

(52) U.S. Cl.
CPC .................... *G06Q 40/06* (2013.01)

(58) Field of Classification Search
CPC ..................................... G06Q 40/06
USPC ........................................... 705/36
See application file for complete search history.

(56) References Cited

U.S. PATENT DOCUMENTS

| | | | |
|---|---|---|---|
| 7,617,140 B2 | 11/2009 | Tarbox et al. | |
| 8,768,800 B2 * | 7/2014 | Milosavljevic | G06Q 40/00 705/35 |
| 2005/0234792 A1 * | 10/2005 | Gagnon | G06Q 40/02 705/36 R |
| 2011/0106743 A1 * | 5/2011 | Duchon | G06F 16/35 706/46 |
| 2011/0249073 A1 * | 10/2011 | Cranfill | H04N 7/147 348/14.02 |
| 2014/0279693 A1 * | 9/2014 | Roy | G06Q 40/06 705/36 R |
| 2015/0095263 A1 * | 4/2015 | Globe | G06Q 40/06 705/36 R |
| 2016/0225086 A1 * | 8/2016 | Seitz | G06Q 40/06 |
| 2016/0266752 A1 * | 9/2016 | Wu | G06F 16/904 |
| 2017/0046806 A1 * | 2/2017 | Haldenby | G06Q 20/0655 |

* cited by examiner

*Primary Examiner* — Joseph W. King
*Assistant Examiner* — Amit Patel
(74) *Attorney, Agent, or Firm* — Fletcher Yoder, P.C.

(57) ABSTRACT

A system may include a processor that receives investor data associated with a user, such that the investor data includes investments held by the user. The processor may then determine a reallocation plan of the investments based on the investor data, send a request to a computing device associated with the user that prompts a response for approval or denial to enable the processor to reallocate the investments according to the reallocation plan, and track the investments over a period of time as if reallocated per the reallocation plan when the response includes the denial. The processor may then generate a first set of visualizations that correspond to a current balance of the one or more investments over the period of time as if reallocated per the reallocation plan and send the first set of visualizations to the computing device, such that the computing device displays the first set of visualizations.

20 Claims, 6 Drawing Sheets

SYSTEMS AND METHODS FOR AUTOMATICALLY REALLOCATING INVESTMENT FUNDS

CROSS REFERENCE TO RELATED APPLICATION

This application claims priority to and the benefit of U.S. Provisional Application No. 62/286,171, entitled "SYSTEMS AND METHODS FOR AUTOMATICALLY REALLOCATING INVESTMENT FUNDS," filed Jan. 22, 2016, which is hereby incorporated by reference in its entirety for all purposes.

BACKGROUND

The present disclosure relates generally to automatically reallocating investment funds. More specifically, the present disclosure relates to automatically reallocating investment funds during the course of a lifetime in view of a number of factors. It is now recognized that traditional techniques for fund management need improvement. As an example, U.S. Pat. No. 7,617,140, which is hereby incorporated by reference, is generally directed to systems and methods for investment performance and would benefit from present embodiments.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a processor that may receive investor data associated with a user, such that the investor data may include one or more investments held by the user. The processor may then determine a reallocation plan of the one or more investments based on the investor data and send a request to a computing device associated with the user, such that the request may enable the processor to reallocate the investments according to the reallocation plan. The processor may then track the one or more investments over a period of time as if reallocated per the reallocation plan when the request is denied, generate a first set of visualizations that correspond to a current balance of the one or more investments over the period of time as if reallocated per the reallocation plan, and send the first set of visualizations to the computing device, wherein the computing device is configured to display the first set of visualizations.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
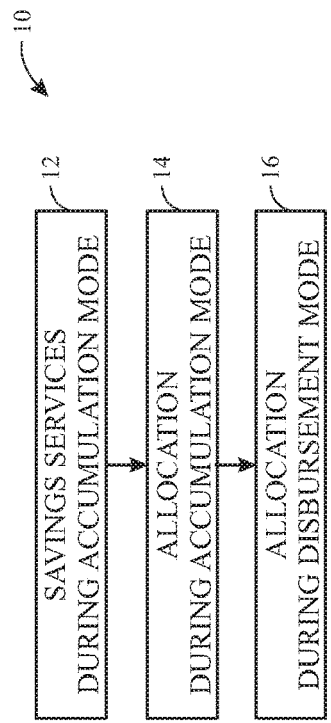
FIG. 1 illustrates a block diagram of various investment modes that characterize various stages of investment opportunities for an investor, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Investment options continue to increase as various investment vehicles become available and additional investment vehicles are created. Generally, investment options and plans currently insist that the investor (e.g., user) remain actively involved in how a respective investment plan is maintained. For example, when an investment plan (e.g., 401k retirement plan) is initially created by the investor, the investor may specify a certain amount of funds to contribute to the investment plan, a certain allocation of risk or diversity of investments for the plan, and the like. After the investment plan is generated, however, the investor generally neglects to track the progress of the investment plan, adjust the investments of the investment plans, or adjust various other factors that may relate to the investment preferences or investment goals regarding the investor. For example, the investor is close to a retirement, the investor's goals may change from growth to security, and this change may not be reflected in the portfolio because of neglect.

By failing to adjust the investment plan during the course of the plan, the investor reduces his or her opportunities to maximize the potential of his or her respective investment. Given that many investment plans are used to provide a sufficient retirement income, investors should take care to actively manage their respective investment plans. Unfortunately, some investors may lack the knowledge to adjust various properties regarding their investment plans, the time to regularly maintain or track the progress of their investment plan, or the confidence to adjust various aspects of their plans on their own.

With the foregoing in mind, the presently disclosed systems and techniques may automatically reallocate investment funds or generate recommendations for the investor over the course of an investment period. The reallocation of investment funds or recommendations may be triggered by various types of information such as the investor's goals, age, life events, employment status, economic changes, and the like. In certain embodiments, an investment plan system may regularly track the progress of investments in an investment plan and automatically generate recommendations to reallocate investment funds over the course of the investment plan based on preferences received by the investor.

In addition, the investment plan system may generate recommendations and track the progress of those recommendations to assist the investor to better understand a value in reallocating funds. The investment plan system may also receive data regarding the investor to better ascertain whether the investments of the investment plan initially selected by the investor still meets the goals of the investor. In certain embodiments, the data related to the investor may be received via inputs from the investor, various types of social media associated with the investor, a wearable device associated with the investor, and the like. By receiving various types of data related to the investor from various sources, the investment plan system may be better suited to automatically reallocate funds of the investor based on various events associated with the investor. Additional details regarding how the investment funds may be reallocated for the investor based on these events will be discussed in more detail below.

By way of introduction, FIG. 1 illustrates a block diagram of various investment modes of operation for systems and methods in accordance with present embodiments that characterize various stages of investment opportunities for a general investor. Referring to FIG. 1, an investment mode process 10 may include three general stages: savings while accumulating capital, allocation while accumulating capital, and allocation when capital is no longer being accumulated. Although the investment mode process 10 describes just three modes, it should be noted that the description of the investment mode process 10 is merely provided as an example, and, in other embodiments, various other stages may also be incorporated into the process.

In one embodiment, the investment mode process 10 may begin at block 12, which corresponds to savings services during accumulation mode. As discussed herein, accumulation mode may refer to a period of time when an investor is accumulating capital. For example, the accumulation mode may be characterized by the investor being employed, receiving income at regular intervals, or the like. The savings services may include services provided by a financial institution to assist the investor in saving or holding his accumulated capital. Generally, the savings services during accumulation mode may correspond to an early part of the investor's career when the investor recently enters the job market, after the investor completes his high school or college education, or the like.

At block 12, the investor may be interested in accumulating savings. As such, financial institutions, such as banks, may offer various forms of savings services to the investor. For example, the financial institution may offer checking accounts, savings accounts, certificate of deposits (CDs) accounts, and other account services that may assist the investor in saving his earned capital.

After a certain period of time, the investor may have accumulated a certain amount of capital, such that it may be financially prudent to begin allocating certain amounts of his funds into various investment instruments. As such, at block 14, the investment mode process 10 may include an allocation stage while the investor is still in an accumulation mode. That is, the investor may begin allocating his funds into various investment instruments while still accumulating capital. For instance, at block 14, the investor may invest in mutual funds, stocks, insurance policies, real estate, and the like. In any case, the investment instruments may be designed to provide a certain rate of return with respect to the amount invested. It should be noted that different investment instruments have different levels of risk associated with them. As such, the investor may take care to choose investment instruments that suit his comfort with regard to risk.

After the investor completes the accumulation mode, the investor may begin a disbursement mode at block 16. The disbursement mode may correspond to a period of time when the investor begins to divest his investments. As such, the disbursement mode may be associated with when the investor retires. At block 16, the investments of the investor may again be reallocated to minimize risk of loss in the investment. That is, since the disbursement mode may be associated with a retirement of an investor, it may be in the interest of the investor to reallocate his funds to minimize risk of loss and to begin retrieving some of the investments for use by the investor.

As shown in FIG. 1, the investment mode process 10 may involve reallocating funds of an investor at various points in time. Often, the reallocation of the funds may occur at various stages in an investor's life, as opposed to just different points in time or the investor's age. However, most investors do not regularly track their investments or make any reallocation decisions after the initial decision of investing in certain investment vehicles. By not modifying or reallocating funds, the investor may not maximize his investments for a high rate or return. Alternatively, by not reallocating funds at certain times, the investor may risk losing portions of his funds when the investor may be in the disbursement mode or when it may be difficult for the investor to enter or remain in the accumulate mode.

Figure 2:
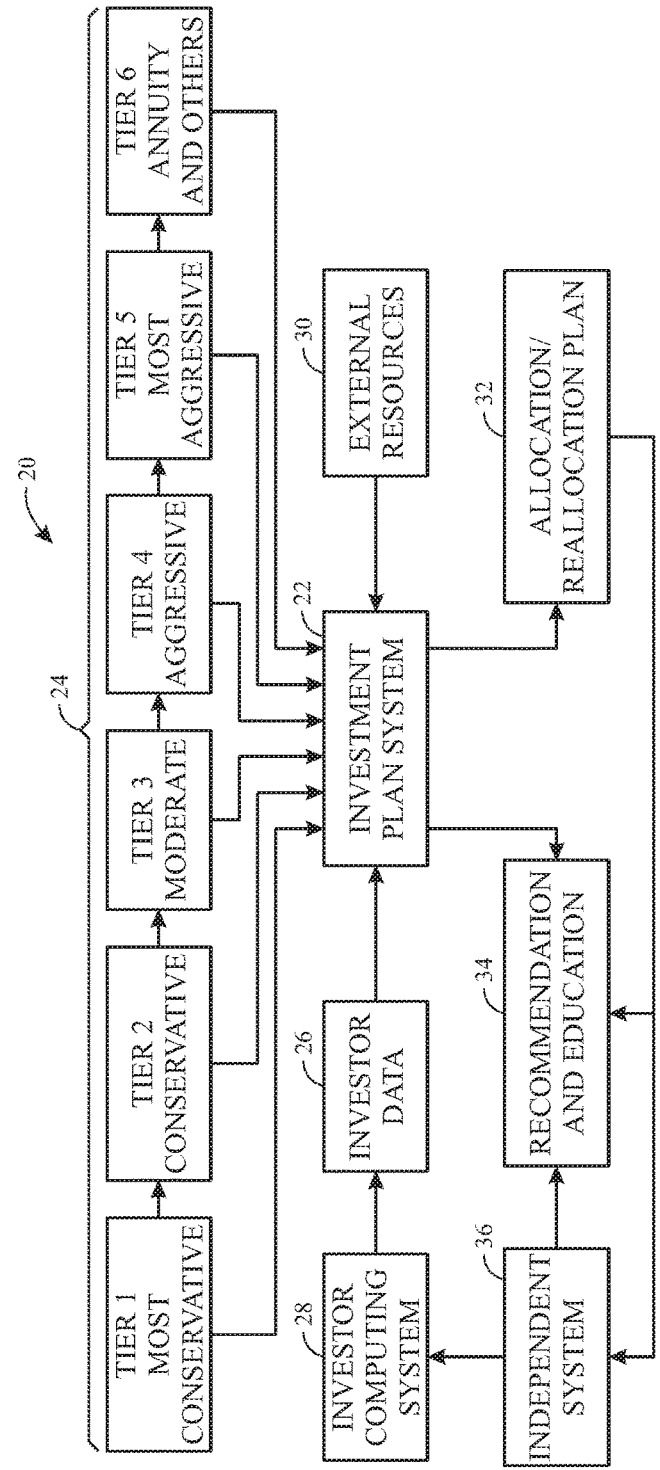
FIG. 2 illustrates a block diagram of an investment plan model, in accordance with embodiments described herein

With the foregoing in mind, FIG. 2 illustrates a block diagram of an investment plan model 20 that illustrates an example of data provided to an investment plan system (e.g., 11), such that the investment plan system may determine an allocation or reallocation plan for an investor. Although the investment plan model 20 illustrates a certain number of inputs, it should be noted that, in other embodiments, the investment plan model 20 may include a number of additional inputs or fewer inputs than illustrated.

Referring to FIG. 2, in one embodiment, the investment plan model 20 may include an investment plan system 22, which may receive data regarding an investor and data regarding various types of investment instruments from various sources. Using this data, the investment plan system 22 may generate an allocation or reallocation plan for investments of the investor, recommendations for the investor, educational material for the investor, or the like.

In one embodiment, the investment plan system 22 may be any suitable computing device capable of receiving data, performing analysis on the data, and outputting data to a user, a display, a communication network or the like. Additional details regarding the investment plan system 22 will be described with reference to FIG. 3.

As mentioned above, the investment plan system may receive data regarding various investment instruments 24. The investment instruments 24 may include a number of investment strategies that employ different investment vehicles that may be designed to increase a financial return on investment. The investment instruments 24 may include mutual funds, real estate, stocks, life insurance policies, and other investment vehicles that allow the investor to invest funds for potential growth. In certain embodiments, the investment instruments 24 may be organized into different levels or tiers. Each tier of investment instruments may be associated with a certain level of risk with regard to the investment. For instance, tier 1 may be categorized as a conservative investment that is associated with relatively low risk as compared to the other tiers in the investment instruments 24. With this in mind, tier 2 may be less conservative than tier 1 but more conservative than tier 3. As such, tier 2 may be associated with a higher degree of risk as compared to tier 1 and a lower degree of risk as compared to tier 3. This trend may continue for tiers 1-5 depicted in FIG. 2.

In any tier of investment instruments, the type of investment instruments 24 included in the respective tier may be grouped together to achieve a certain risk in investment. For instance, since tier 1 may be associated with a conservative or low risk value, the investment instruments 24 that may mostly make up the tier 1 investment may include bonds, which are generally categorized as low risk investments. In addition to being a low risk investment, the tier 1 investment category may also be associated with a low growth characteristic. That is, the investment instruments 24 in the tier 1 group may not have the potential to grow at as high a rate as that an investment in tier 5. However, the investment instruments 24 of tier 5 may be associated with a higher degree of risk of loss, as compared to the risk of investment instruments 24 that make up the lower tiers.

In one embodiment, tier 6 may be associated with annuity investment instruments and the like. As such, tier 6 may be related to a separate class of investments instruments 24 that may be evaluated differently as compared to the risks associated with tiers 1-5.

In addition to receiving data regarding each tier of the investment instruments 24, the investment plan system 24 may receive data regarding how the investment instruments 24 are diversified within each tier. Moreover, the investment plan system 22 may determine a risk level, a growth potential, and other attributes of each tier. The investment plan system 22 may use the different tiers of investment instruments 24 to determine how to allocate or reallocate funds for an investor.

To determine how to allocate funds of the investor, the investment plan system 22 may receive investor data 26. The investor data 26 may include information regarding the investor, such as an age of the investor, desired investment risk levels of the investor, various social attributes of the investor, and the like. The desired investment risk levels may help indicate a type of investment risk level that the investor may be comfortable contributing his funds. The investment risk levels may be defined by the investor via a survey, questionnaire, or the like. In one embodiment, the investor may input data regarding various characteristics regarding the investor in an application or program being executed on an investor computer system 28, and the investor computer system 28 may then determine the investment risk levels associated with the investor based on the inputs and determined mode (e.g., 12, 14, 16) of operation. The investor data 26 may also include financial information regarding the investor such as a current bank balance, a current list of assets, a current list of debts, a credit score, and the like.

In one embodiment, the investor data 26 may include rules that may dictate how certain investment instruments 24 are to be managed. For example, the investor data 26 may indicate that funds are not to be allocated to certain types of businesses that the investor may not wish to support. Alternatively, the investor data 26 may indicate that when a certain market condition exists (e.g., certain interest rates are lower than a certain percentage, a stock index is higher than a certain value), the investor may prefer to perform some action (e.g., invest or divest) regarding his investment instruments. This may be based on what mode (e.g., 12, 14, 16) the investor is determined to be operating in.

With the foregoing in mind, the investor computing system 28 may include any suitable computing device such as a general purpose computer, a mobile-computing device, a tablet-computing device, a laptop-computing device, or the like. In certain embodiments, the investor computing system 28 may include a wearable-computing device, such as an activity tracker or any other suitable device that monitors certain aspects of the user. For example, the wearable-computing device may monitor a number of steps taken by the user, a heart rate of the user, and other information related to the user. This information may be provided to the investment plan system 22 as investor data 26.

The investment plan system 22 may also receive information from external resources 30. The external resources 30 may include a number of databases or network-connected computers that include information regarding current events, financial market data, political events, environmental conditions, and the like. As such, the external resources 30 may include any suitable medium that includes information that may be relevant to the current financial environment of the investor. That is, since financial markets may be affected due to different political parties holding various political positions throughout the world, conflicts arising between different nations or within a particular nation, natural disasters occurring in certain areas, and the like, the external resources 30 may provide information related to these items. In one embodiment, the external resources 30 may include various websites and databases that may be accessible via the Internet.

Additionally, the external resources 30 may also include various social media sites such as Facebook®, Twitter®, Instagram®, and the like. In certain embodiments, the investor data 26 may be retrieved from the social media sites via the external resources 30 to provide additional information regarding the social attributes of the investor and the mode (e.g., 12, 14, 16) in which a system should operate for the investor. Using the investor data 26 gathered from social media sites, the investment plan system 22 may determine whether certain life events (e.g., marriage, children, retirement) may have occurred without receiving direct input from the investor. This information may also be used to assign a mode of operation to the user.

Using the information provided to the investment plan system 22, the investment plan system 22 may determine an allocation or reallocation plan 32 for the investor. In one embodiment, the investment plan system 22 may determine how the investor's funds are currently being allocated based on the investment instruments 24 owned by the investor, based on information provided via the investor data, and the like. The investment plan system 22 may then determine a recommended allocation or reallocation of funds for the investor based on the investment preferences of the investor, the desired risk level of the investor, social attributes of the investor, a recommended investment mode, and the like. The investment plan system 22 may also consider data provided from the external resources 30 to assess the current financial climate for various investment instruments 24. Using the collection of data mentioned above, the investment plan system 22 may determine an allocation plan (e.g., if no allocation previously existed) or a reallocation plan (e.g., if an allocation plan previously existed) that may best fit the different characteristics of the investor. In one embodiment, the investment plan system 22 may use the collected data to determine a risk value that may suit the near or long term goals of the investor. For example, if the investor is near a retirement age, the investment plan system 22 may determine that the risk value that suits the investor may be lower than a risk value for an investor that is beginning his career. Using the determined risk value and other properties defined by the investor data 26, the investment plan system 22 may determine a collection of investment instruments 24 that may match the risk value associated with the investor. In one embodiment, the investment plan system 22 may use the tiers of the investment instruments 24 described above to identify a mix of investment instruments 24 that may match the determined risk value for the investor.

In addition to the allocation or reallocation plan 32, the investment plan system 22 may generate recommendations 34 regarding the allocation or reallocation plan 32 for the investor to review before implementing the allocation or reallocation plan 32. In some cases, the recommendations 34 may include educational material 34 that indicates reasons for creating the respective allocation or reallocation plan 32. For example, if the investor is nearing a retirement age and the reallocation plan 32 recommends investing the investor's funds into a more conservative investment instrument 24, the educational material 34 may indicate that by moving the funds to a more conservative or less risk-associated instrument, the investor may avoid the risk of losing some of his funds before retirement, when the funds may begin to operate in a disbursement mode and may not be able to recoup losses. By providing the recommendations and the educational material 34, the investment plan system 22 may provide investors with a better understanding of how investment instruments 24 should be managed.

In one embodiment, the recommendation and educational material 34 and the allocation or reallocation plan 32 may be provided to an independent system 36 for review. The independent system 36 may evaluate the allocation or reallocation plan 32 from a perspective that is independent of interests that may be associated with the investment plan system 22. For instance, the investment plan system 22 may have certain relationships with various providers of investment instruments 24. As such, there may be a perception of a conflict of interest when the investment plan system 22 recommends reallocating funds into an investment instrument that has a relationship with the investment plan system 22. The independent system 36 may identify these conflicts to bring to the attention of the investor. Moreover, the independent system 36 may evaluate the recommendation to determine whether they follow some prudent investment plan that it would also support. In any case, after reviewing the recommendations and educational material 34 and the allocation or reallocation plan 32, the independent system 36 may send the original information, data related to the conflicts, any flags raised by the review, to the investor computing system 28. In one embodiment, the independent system 36 may provide the information to the investor computing system 28 via an electronic-mail message, a direct message via a communication network, or the like.

Although FIG. 2 illustrates the recommendations and educational material 34 and the allocation and reallocation plan 32 being transmitted to the independent system 36, it should be noted that, in some embodiments, these items may be directly provided to the investor computing system 28 without being reviewed by the independent system 36. In another embodiment, the allocation or reallocation plan 32 may be automatically implemented without sending the plan 32 to the investor computing system 28. In this case, the investor data 26 may indicate that the investment plan system 22 may be authorized to periodically reallocate the funds of the investor based on the information provided in the investor data, the external resources 30, and the like.

Figure 3:
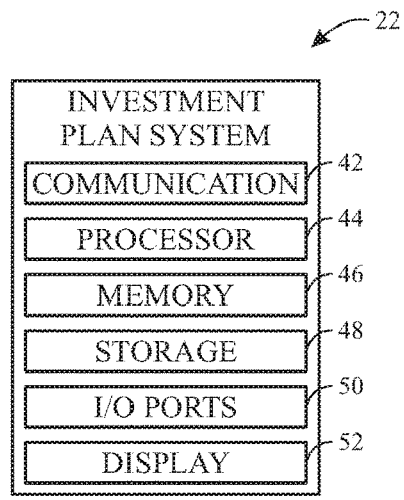
FIG. 3 illustrates a block diagram of an investment plan system that may be employed in the investment plan model of FIG. 2, in accordance with embodiments described herein.

To perform some of the actions set forth above, the investment plan system 22, the investor computing system 28, and the independent system 36 may include certain components to facilitate these actions. FIG. 3 is a block diagram of example components within the investment plan system 22. It should be noted that the investor computing system 28 and the independent system 36 may include similar components for performing its respective operations. Referring now to FIG. 3, the investment plan system 22 may include a communication component 42, a processor 44, a memory 46, a storage 48, input/output (I/O) ports 50, a display 52, and the like. The communication component 42 may be a wireless or wired communication component that may facilitate communication between the investment plan system 22, databases that include information regarding the investment instruments 24, the external resources 30, the investor computing system 28, the independent system 36, and the like.

The processor 44 may be any type of computer processor or microprocessor capable of executing computer-executable code. The processor 44 may also include multiple processors that may perform the operations described below.

The memory 46 and the storage 48 may be any suitable articles of manufacture that can serve as media to store processor-executable code, data, or the like. These articles of manufacture may represent computer-readable media (e.g., any suitable form of memory or storage) that may store the processor-executable code used by the processor 44 to perform the presently disclosed techniques. The memory 46 and the storage 48 may also be used to store the allocation and reallocation plan 32, the recommendation and educational material 34, and the like. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may be interfaces that may couple to other peripheral components such as input devices (e.g., keyboard, mouse), sensors, input/output (I/O) modules, and the like. The display 52 may operate to depict visualizations associated with software or executable code being processed by the processor 44. In one embodiment, the display 52 may be a touch display capable of receiving inputs from a user of the investment plan system 22. The display 52 may be any suitable type of display, such as a liquid crystal display (LCD), plasma display, or an organic light emitting diode (OLED) display, for example. Additionally, in one embodiment, the display 52 may be provided in conjunction with a touch-sensitive mechanism (e.g., a touch screen) that may function as part of a control interface for the investment plan system 22.

It should be noted that the components described above with regard to the investment plan system 22 are exemplary components and the investment plan system 22 may include additional or fewer components as shown. Additionally, as mentioned above, it should be noted that the investor computing system 28 and the independent system 36 may also include similar components as described as part of the investment plan system 22.

Figure 4:
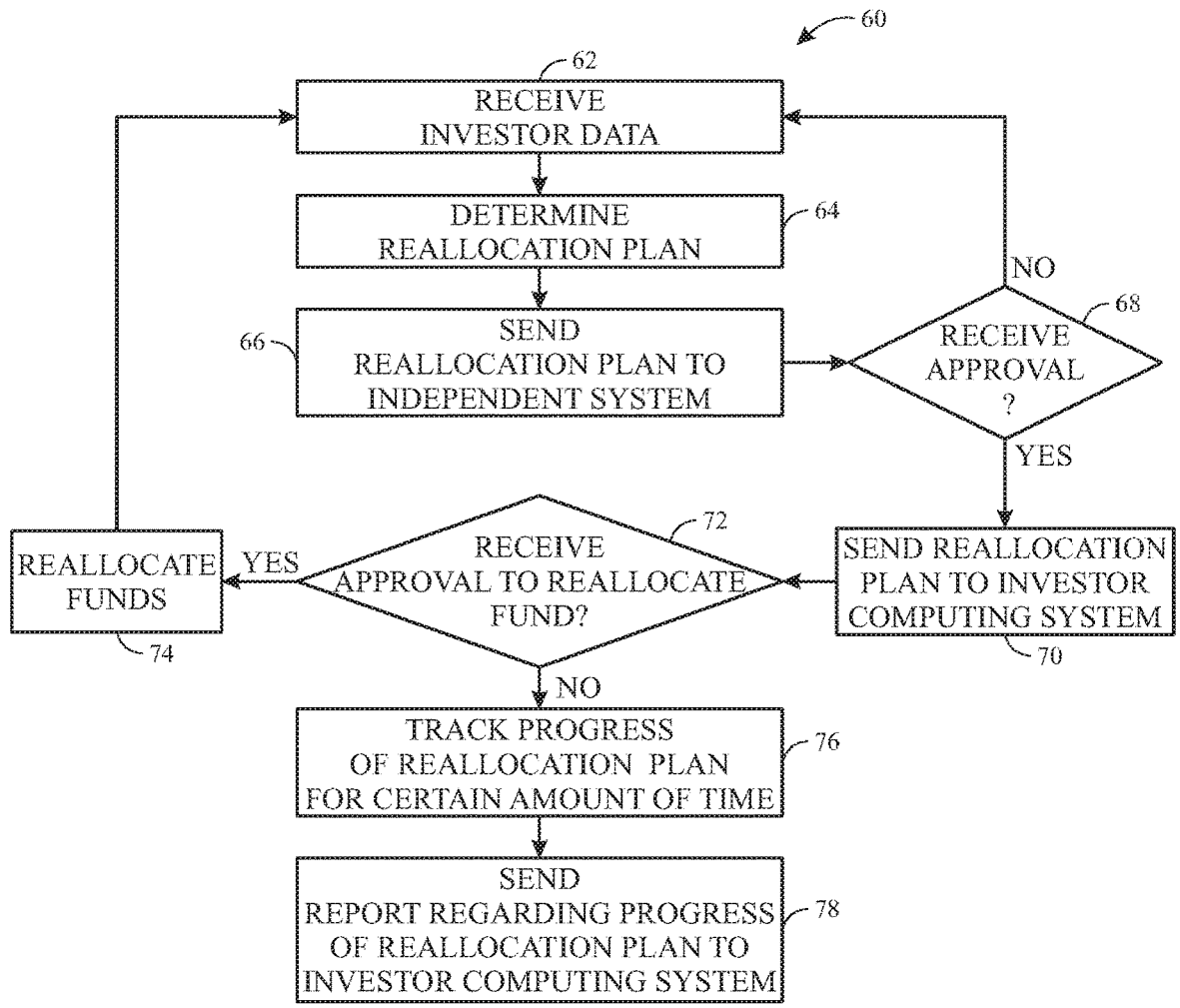
FIG. 4 illustrates a flow chart of a method for tracking progress of an investment reallocation plan, in accordance with embodiments described herein.

With the foregoing in mind, FIG. 4 illustrates a flow chart of a method 60 employed by the investment plan system 22 for sending notifications regarding progress of an allocation or a reallocation plan determined by the investment plan system 22. Although the following description of the method 60 is described in a particular order, it should be noted that the method 60 is not limited to the depicted order; and, instead, the method 60 may be performed in any suitable order.

Referring now to FIG. 4, at block 62, the investment plan system 22 may receive the investor data 26 described above. As such, the investment plan system 22 may receive data associated with the investor, such as demographic information, current financial status information, employment information, and the like.

At block 64, the investment plan system 22 may determine a reallocation plan 32 based on the investor data 26 and an associated mode of operation (e.g., 12, 14, 16). In one embodiment, the investment plan system 22 may send the determined reallocation plan 32 to the independent system 36 at block 66. In this case, the investment plan system 22 may, at block 68, wait to receive approval from the independent system 36. As discussed above, the independent system 36 may evaluate the reallocation plan 32 determined at block 64 with respect to conflicts of interest between an organization associated with the investment plan system 22 and the investor. The independent system 36 may also evaluate the reallocation plan 32 based on the investor data 26 as well. Here, the independent system 36 may evaluate the reallocation plan 32 based on a different algorithm, as compared to the investment plan system 22. However, the independent system 36 may just evaluate the reallocation plan 32 for significant (e.g., greater than 50% difference in growth projection) differences between the reallocation plans 32 determined by the investment plan system 22 and the independent system 36. That is, every organization may use different factors when determining the reallocation plan 32, and thus two different organizations may determine two different reallocation plans 32. However, the independent system 36 may review the reallocation plan 32 determined by the investment plan system 22 to ensure that the investor's interests are being satisfied.

At block 68, the investment plan system 22 may determine whether it has received an approval from the independent system 36. If the independent system 36 did not send an approval, the investment plan system 22 may return to block 62 to determine a new reallocation plan 32. If, however, the investment plan system 22 does receive an approval message from the independent system 32, the investment plan system 22 may proceed to block 70.

At block 70, the investment plan system 22 may send the reallocation plan 32 determined at block 64 to the investor computing system 28. In one embodiment, by sending the reallocation plan 32 to the investor computing system 28, the investor computing system 28 may automatically execute or open an application associated with the management of the investor's investment instruments 24. That is, upon receiving the reallocation plan 32 or a notification indicative of the reallocation plan 32, the investor computing system 28 may open an associated application despite the application being closed (e.g., not currently executed), despite the investor computing system 28 being in a sleep or low-power mode, or the like. Although block 70 is described as sending the reallocation plan 32 to the investor computing system, in certain embodiments, the investment plan system 22 may, instead, send the reallocation plan 32 to an email address, a cloud service, or the like, which may then be accessed by the investor.

At block 72, the investment plan system 22 may determine whether approval to reallocate funds based on the reallocation plan 32 was received. Generally, the approval may be received from the investor via the investor computing system 28 or the like. The approval may be an authorized electronic message or signal that authorizes the investment plan system 22 to reallocate the funds. As such, if, at block 72, the investment plan system 22 receives the approval, the investment plan system 22 may proceed to block 74 and reallocate the funds based on the reallocation plan 32.

If, however, the investment plan system 22 does not receive approval to reallocate funds, the investment plan system 22 may proceed to block 76 and track the theoretical progress of the investor's funds as if the funds were reallocated based on the reallocation plan 32. In one embodiment, the investment plan system 22 may track the progress of the unapproved reallocation plan over a period of time (e.g., one year). In addition to tracking the theoretical progress of the investor's funds, the investment plan system 22 may send an electronic block to an associated account to prevent the investor's funds from being reallocated, as will be described further below.

After a certain amount of time has passed, the investment plan system 22 may proceed to block 78. At block 78, the investment plan system 22 may generate a report regarding the progress of the unapproved reallocation plan 32. The investment plan system 22 may then send the report to the investor via the investor computing system 28. In certain embodiments, the investment plan system 22 may send the report to a cloud service or some other online service where the investor may access the report. In any case, the report may provide information related to the expected value of funds or investment instruments 24 that the investor may have accumulated if the reallocation plan 32 determined at block 64 was approved at block 72. By tracking the progress of the unselected reallocation plan 32, the investment plan system 22 may provide the investor with valuable information regarding how the reallocation plan 32 could have aided the growth of the investor's funds.

Often times, investors may fail to reallocate funds because they may be unaware of the value of reallocating funds. Alternatively, investors may be hesitant to reallocate their funds being unaware of what is involved with reallocating funds. By providing the report, the investment plan system 22 may help educate or inform the investor of the potential benefits of implementing a reallocation plan.

Figure 5:
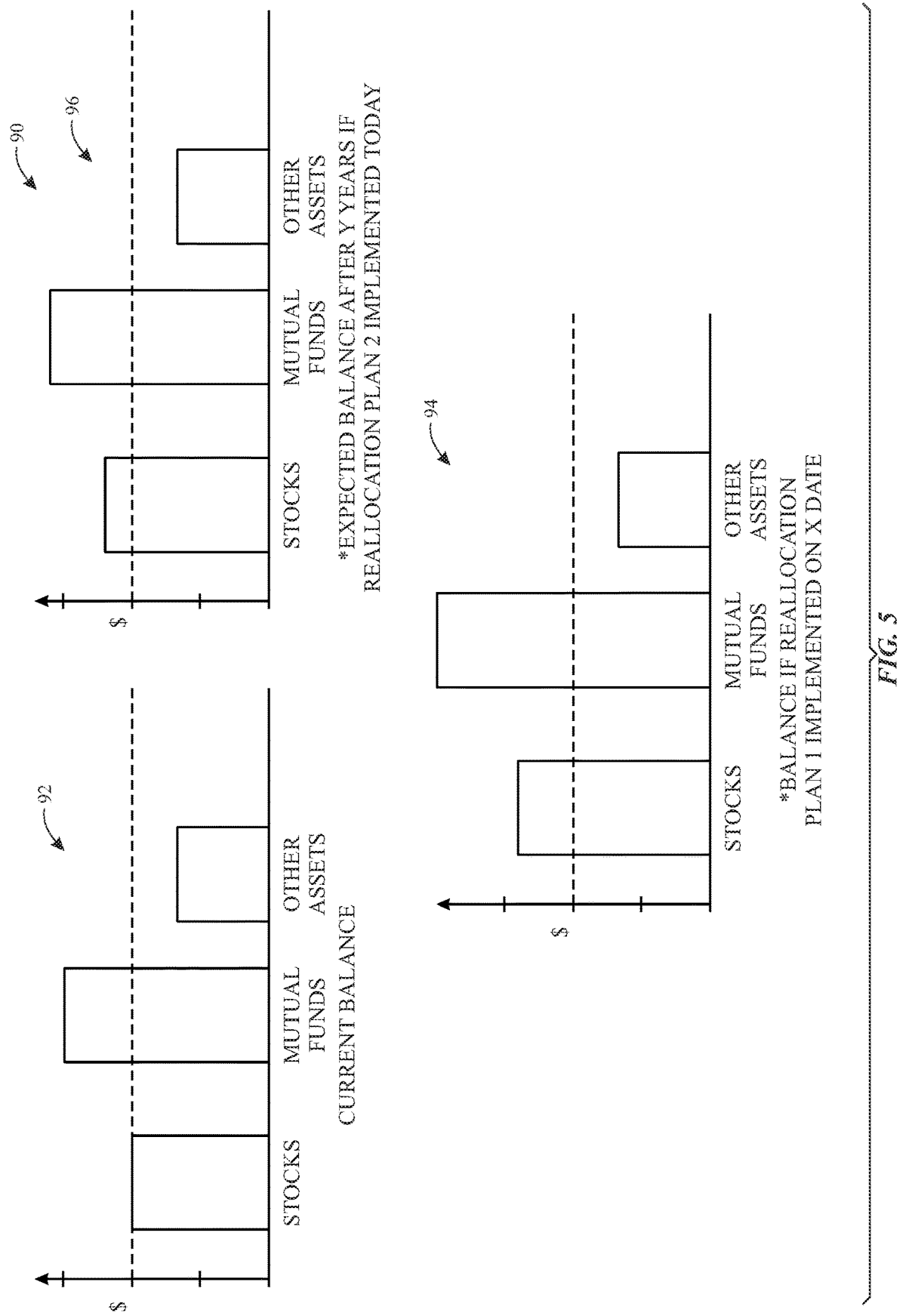
FIG. 5 illustrates example visualizations that depict the performances and projected performances of various investment plans, in accordance with embodiments described herein.

In one embodiment, the report may include visualizations to assist the investor in appreciating the value of the unapproved reallocation plan 32. For example, FIG. 5 illustrates example visualizations 90 that may be part of the report generated at block 78 of the method 60. Referring to FIG. 5, the visualizations 90 include a current balance visualization 92, a reallocation balance visualization 94, and an expected balance visualization 96.

The current balance visualization 92 may include a number of bar graphs that represent the values of a number of different investment instruments 24. For instance, the current balance visualization 92 indicates that the investor had investment instruments 24 in stocks, mutual funds, and other assets.

In addition to the current balance visualization 92, the investment plan system 22 may generate the reallocation balance visualization 94. The reallocation balance visualization 94 may indicate an expected status of the investment instruments 24 of the investor if the investment plan system 22 received approval to reallocated the investor's funds at block 72 of the method 60. By providing the expected status of the investor instruments 24, the investment plan system 22 may enable the investor to evaluate the opportunity costs associated with the reallocation plan 32 that he chose not to approve.

The investment plan system 22 may also generate the expected balance visualization 96, which may indicate a projected estimate of values for the investment instruments 24 of the investor if he chose to reallocate his funds immediately. The expected balance visualization 96 may be determined based on various forecasting algorithms that may account for industry trends, empirical data, and the like. By providing the expected balance visualization 86, the investment plan system 22 may reinforce the notion that reallocation may assist the investor to achieve greater growth in the respective investment instruments 24.

Although the visualizations depicted in FIG. 5 include bar graphs, it should be noted that the visualizations are not limited to bar graphs. Instead, the visualizations may include line graphs or any other suitable visualization that may visualize how the investment instruments 24 may perform under various scenarios.

In some embodiments, the generated visualizations, recommendations, reallocations plans, and other data products (e.g., alerts) described herein may be accessible to the investment plan system 22 using blockchain technology. Blockchain technology may include a distributed network of computing devices that maintains a continuously-growing list of records or blocks linked to each other to provide enhanced network security. That is, blockchain technology may be used to ensure that the data accessed by the user via the investment plan system 22 is secure and provided to an appropriate party.

Blockchain technology may include one or more blockchain nodes that host copies of a blockchain. For example, the blockchain nodes may be computers that are communicatively coupled to the investment plan system 22. The nodes may store the blockchain in a storage device (e.g., non-volatile memory) accessible by the nodes. As used herein, a blockchain refers to a distributed data store that maintains a dynamic list of data records that are hardened against tampering and revision. For example, in the current embodiments, the blockchain may be a data store that maintains the investor data and the like. The information stored in the blockchain may be accessed by the investment plan system 22 or other computing devices, such that authentication of a user may occur, using the blockchain information. For example, the authentication may occur in accordance with the method 60 of FIG. 4, where the decision to send the report regarding the progress of the reallocation plan to the investor computing system is based on information from an associated blockchain that indicates that the investor computing system is indeed associated with the user.

Figure 6:
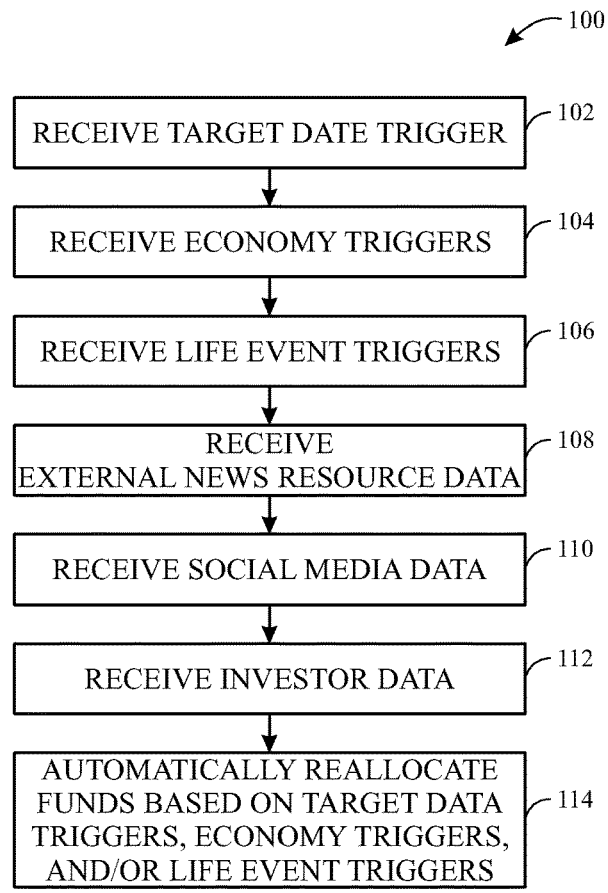
FIG. 6 illustrates a flow chart of a method for automatically reallocating investment funds based on various triggers, in accordance with embodiments described herein.

Referring now to FIG. 6, in addition to sending the reallocation plan 32 to the investor computing system 28, the investment plan system 22 may automatically reallocate funds of the investor without sending a request for approval. FIG. 6 illustrates a method 100 for automatically reallocating investment funds based on various triggers. Generally, the method 100 may receive various triggers that may be specified by the investor, such that the triggers may cause the investment plan system 22 to automatically reallocate the investment instruments 24 of the investor. Additional details with regard to the method 100 will be discussed below.

At block 102, the investment plan system 22 may receive target date triggers from the investor via the investor computing system 28 or the like. In one embodiment, the investment plan system 22 may determine the target date triggers based on the investor data 26. The target date triggers may indicate one or more dates that the investor may indicate to reallocate funds with regard to the modes (e.g., 12, 14, 16) described above. The date triggers may be selected based on certain life events for the investor. For example, the date trigger may be set as a date in which the investor chooses to retire or within a number of months before an actual retirement date. In this case, when the investment plan system 22 determines that the date trigger has been reached, the investment plan system 22 may perform some action, such as automatically reallocating the investment instruments 24 of the investor. In this way, the investment plan system 22 may begin a process to de-risk or reduce a risk level associated with the investment instruments 24. Other potential date triggers may include, for example, the health of the investor (e.g., results of medical exams, emergency trip to medical center, etc.), the age of the investor, the location of the investor, and the like.

Potential date triggers may include a date in which a child gains acceptance into college and disbursement of funds associated with college expenses, dates in which obligatory loans start or end (e.g., automobile loan, home loan, personal loans, etc., where the start of such a loan indicates lower funds availability towards investment and ending indicates higher funds availability), calendar dates patterns to change investment modes and fund types based on market history (e.g., aggressive approach towards beginning of the year, and more conservative approach towards the end of the year, historical data on calendar dates when market was bullish versus bearish, etc.), and the like.

At block 104, the investment plan system 22 may receive one or more economy triggers. The economy triggers may correspond to certain economical values or indicators that may represent the state of an economy of a nation, the economy of a region of the world, the global economy, or the like. For instance, the economy trigger may include the gross national product associated with a particular country. The economy trigger may also include various stock market index values, a bond market index, a price of gold, and other suitable values that may be associated with assessing the economical state of a region of a nation, a nation, a group of nations, or the like.

In certain embodiments, the economy triggers may be associated with different sectors of an economy. For instance, the economy triggers may be related to the performance of high technology corporations, real estate markets (e.g., average residential home prices), and the like.

The investment plan system 22 may receive the economy triggers via the investor data 26, which may include the economy triggers of interest to the investor. In certain embodiments, the investment plan system 22 may determine the economy triggers based on the allocation of the investment instruments 24. That is, the investment plan system 22 may determine whether a portion of the investment instruments 24 is associated with one particular market (e.g., real estate, stocks, NADAQ, etc.) composes more than a certain percentage of the total amount of the investment instruments 24. If the portion is greater than the certain percentage, the investment plan system 22 may determine one or more economy triggers for the allocation of the investment instruments 24 to reduce the risk of loss under certain economic conditions (e.g., stock market sharp decline).

At block 106, the investment plan system 22 may receive one or more life event triggers. The life event triggers may correspond to certain situations or events that mark certain milestones in one's life. For example, the life events may include graduating school (e.g., high school, college, graduate school), starting a new job, being promoted, receiving raises, getting married, having children, retiring, and the like. In one embodiment, the life event triggers may be specified in the investor data 26 and may be performed in conjunction with block 102. Moreover, the life event triggers may also be used to determine which mode (e.g., 12, 14, 16) that the investor is in.

At block 108, the investment plan system 22 may receive news data from the external resources 30. The news data may be related to current events as determined by top headlines that may exist on a number of news websites. The news data may also include data associated with various stock markets, stock market indexes, gross domestic product estimates, and other economic measurements. Generally, the news data may include data that may affect investments held by the investor.

At block 110, the investment plan system 22 may receive social media data associated with the investor. That is, the investment plan system 22 may have access to various social media website accounts held by the investor. As such, the investment plan system 22 may have access to status updates provided by the investor, comments written by the investor or directed at the investor, and other information available to social media websites. The social media data may assist the investment plan system 22 to determine whether life events have occurred, whether the investor may desire that target date triggers change, and other information regarding the investor.

At block 112, the investment plan system 22 may receive the investor data 26 described above. As such, the investment plan system 22 may receive data related characteristics regarding the investor.

At block 114, the investment plan system 22 may reallocate funds based on the target date triggers, the economy triggers, and the life event triggers. That is, the investment plan system 22 may electronically initiate the reallocation of the funds via institutions that may manage or control the allocation of the investments. In certain embodiments, the investment plan system 22 may use the news data to determine whether certain economy triggers have occurred. In the same manner, the investment plan system 22 may use the social media data and/or the investor data 26 to determine whether certain life event triggers have occurred. In any case, upon determining that the target date triggers, the economy triggers, and/or the life event triggers have occurred, the investment plan system 22 may reallocate funds according to rules defined by the investor data 26, recommendations determined by the investment plan system 34, recommendations provided by the independent system 36, or the like. As such, the investment plan system 22 may reallocate funds to reduce risk for the investor as the investor has increased responsibilities (e.g., family), nears retirement age, or the like.

For example, the target date triggers may be represented as a variable T, the economy trigger may be represented as a variable E, and the life event triggers may be represented as a variable L. Each variable for the trigger may be represented as a 1 or a 0 to indicate whether the trigger event occurred or did not occur. Using the investor data 26, each of the variables described above may be assigned some weight factor (e.g., W1, W2, W3) to represent a relative importance of each trigger for the investor. As such, when a trigger event occurs or when multiple trigger events occur, the investment plan system 22 may use the weights and the values assigned to the variable (e.g., T, E, L) to determine whether a threshold is reached. That is, the investment plan system 22 may determine whether $T*W1+E*W2+L*W3$ is greater than some threshold. If the sum is greater than the threshold, the investment plan system 22 may reallocate the funds.

The reallocation plan may be generated, in some instances, based on the various investment instruments 24 described above. In one embodiment, the investment plan system 22 may access an application or program operating on the investor computing system 28 to initiate the application and perform the reallocation operations with the investor's tool and/or consent. The reallocation plan may, in some embodiments, be a user-configurable plan that provides the user the option to set rules based on the risk preferences of the user. Rules may also be established to indicate when a reallocation is recommended to occur. Separate rules may also be established to indicate how the reallocation may be implemented. The reallocation trigger (e.g., time to move to a more conservative model or time to move to a more aggressive model) may ignore an implemented rule to shift the funds across the investment instruments 24 described above. In some embodiments, the reallocation operations may be implemented according to a weighted single-thereshold simplistic approach as described above, or it could include a more complicated algorithm that may use multiple thresholds and weights. For example, apart from weights associated to the triggers, weights could also be associated to the current allocations of funds within the instruments 24. The triggers may be determined based on the combination of trigger weights as well as allocation weights. For example, if the investment plan system 22 determines that there is sufficient allocation of funds in conservative funds for the investor, then despite reaching the trigger threshold, the investment plan system 22 might not actually initiate a reallocation of funds. Alternatively, when an investor has a disproportionate amount of funds allocated in aggressive assets, and if the market turns favorable, then the investment plan system 22 might not trigger to move more funds into aggressive model because the system determines that the investor is already too heavily invested in aggressive funds already (based on instrument weights).

When accessing the application, the investment plan system 22 may also send a notification alert or message to the investor indicating how the funds will be reallocated. In addition, the investment plan system 22 may provide a report or analysis regarding how the risks associated with the investments are affected by the reallocation plan. Further, the investment plan system 22 may provide details regarding how the funds were reallocated, alternate reallocation plans that were not selected, and additional information regarding the reallocation plan. In this way, the investor may have the ability to learn more about the reallocation plan and other options available to the investor if the investor desires to learn more about the reallocation plan or choose to implement an alternate plan.

In some cases, the investments of the investor may include liquid assets such as stocks, bonds, savings, and the like, as well as non-liquid assets. Non-liquid assets may include equity in a business, home, investment property, and the like. The investment plan system 22 may, in one embodiment, evaluate the allocation of liquid assets and non-liquid assets of the investor in accordance with the trigger data mentioned above and generate recommendations regarding how the liquid and non-liquid assets may be reallocated in accordance with the trigger data.

Figure 7:
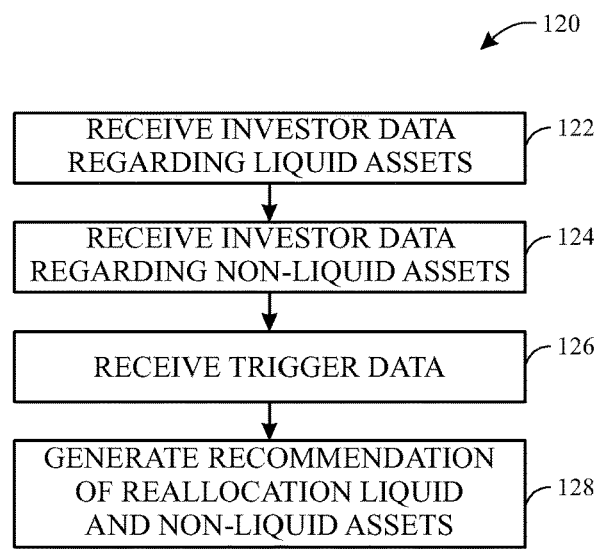
FIG. 7 illustrates a flow chart of a method for generating recommendations to reallocate liquid and non-liquid assets, in accordance with embodiments described herein.

For instance, FIG. 7 illustrates a flow chart of a method 120 for generating recommendations for reallocating liquid and non-liquid assets of the investor. Referring now to FIG. 7, at block 122, the investment plan system 22 may receive investor data regarding liquid assets held by the investor. The liquid assets may be specified within the investor data 26 or may be provided by the investor, various financial institutions, or the like.

At block 124, the investment plan system 22 may receive investor data regarding the non-liquid assets. Generally, the non-liquid assets may include any type of investment that may not be available as cash within a certain amount of time (e.g., minutes, hours, days). As such, non-liquid assets may include vacation homes, real estate, equity in businesses, and other types of investments that may not be converted into cash without selling the respective asset. In some cases, the non-liquid assets may be provided via the investor data 26; however, the non-liquid assets owned by the investor may also be determined based on social media, financial data from a financial advisor, tax returns, public records, and the like. In some embodiments, the investment plan system 22 may request information regarding the non-liquid assets held by the investor from the investor via the investor computing system 28, by initializing an application being executed by the investor computing system 28, and the like.

After receiving the liquid and non-liquid asset information, the investment plan system 22 may receive trigger data. The trigger data may define how the liquid and non-liquid assets are to be allocated based on various triggers. The various triggers may include the target date triggers, the economy triggers, the life event triggers, and the other triggers mentioned above with respect to FIG. 6. In some embodiments, the triggers may define when action is to be undertaken by the investment plan system 22, but the triggers may not define what actions are to be undertaken. It should be noted that the triggers mentioned here may include the triggers described above with regard to FIG. 6.

As such, at block 128, the investment plan system 22 may generate recommendations for reallocation of the liquid and non-liquid assets of the investor based on the trigger data. That is, as certain trigger events occur, the investment plan system 22 may evaluate the overall risk or investment goals of the investor to determine how the liquid and non-liquid assets of the investor should be reallocated. For instance, if the investor specifies a desired retirement age and a desired retirement income, the investment plan system 22 may evaluate the liquid and non-liquid assets at various trigger events to determine whether the investment funds of the investors will achieve the specified goals. If the investment plan system 22 determines that the likelihood of achieving the desired goals are less than some percentage, the investment plan system 22 may generate a recommendation regarding how the liquid assets and the non-liquid assets should be reallocated in view of the specified goals.

When determining recommendations, the investment plan system 22 may use various investment algorithms, input from financial analysts, and the like. In addition, the investment plan system 22 may receive data from the external resources 30 to provide current information for the investment plan system 22. For example, if the investor is nearing retirement age and the external resources 30 include data indicating that home values are expected to decrease, the investment plan system 22 may generate a recommendation for the investor to sell an investment property or vacation home to reduce risk of not achieving the specified retirement goals. By monitoring and providing recommendations regarding the allocation of liquid and non-liquid assets, the investment plan system 22 may provide a holistic investment strategy to assist the investor in managing various types of investments held by the investor.

In addition to providing reallocation recommendations and automatically reallocating funds as mentioned above, the investment plan system 22 may also prevent the reallocation of funds or establish an electronic block of the reallocation of funds under certain conditions. That is, the investment plan system 22 may lock in certain investment behaviors or decisions based on input received from the investor. In other words, the investment plan system 22 may send an electronic block to a institution that prevent funds from being reallocated by the investment plan system 22, the independent system 36, or the investor when certain conditions are present. With this in mind, FIG. 8 illustrates a flow chart of a method 140 for preventing the reallocation of funds based on lock-in conditions.

Figure 8:
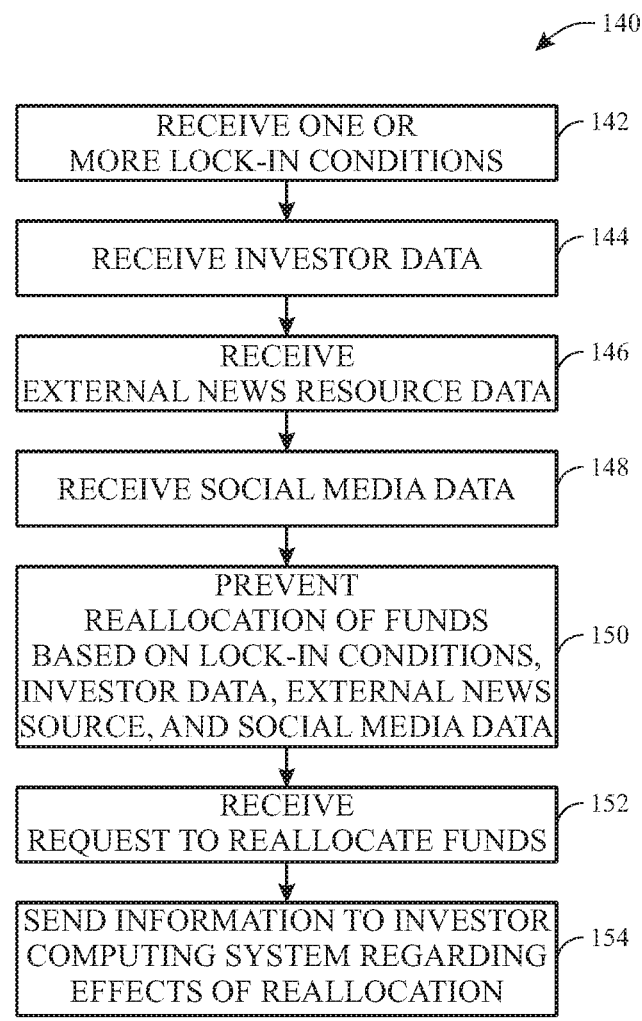
FIG. 8 illustrates a flow chart of a method for preventing the reallocation of investment funds based on various triggers, in accordance with embodiments described herein.

Referring to FIG. 8, at block 142, the investment plan system 22 may receive one or more lock-in conditions. In one embodiment, the lock-in conditions may be specified by the investor in the investor data 26. Additionally, the investment plan system 22 may receive lock-in conditions as inputs from the investor via a questionnaire, a web-based application, an application being executed on the investor computing system 28, or the like.

The lock-in conditions may specify conditions when assets are not to be reallocated. The lock-in conditions may be related to economic conditions, life events, time triggers, and other events that may be specified by the investor. As such, in one embodiment, the lock-in conditions may be related to the target date triggers, the economy triggers, and the life event triggers mentioned above with regard to FIG. 6.

At blocks 144, 146, and 148, the investment plan system 22 may receive the investor data 26, external news resource data from the external resources 30, and the social media data, respectively. Using the information gathered from the investor data 26, external news resource data from the external resources 30, and the social media data, at block 150, the investment plan system 22 may determine whether the lock-in conditions are present. If the lock-in conditions are present, the investment plan system 22 may send an electronic block to an account that prevents the reallocation of funds by the investment plan system 22, by the independent system 36, or the investor. The electronic block may include computer-executable instructions that cause a server or other computing device associated with the user's account that freezes the allocation of funds or prevents the funds from being reallocated. In one embodiment, in addition to sending the electronic block to the computing system associated with the user's account, the investment plan system 22 may send a notification indicative of the electronic block to a computing device associated with the user.

In some embodiments, to bypass the prevention of reallocation of funds, the investment plan system 22 may generate a request for the investor to approve the reallocation of funds in spite of the lock-in condition being present. As such, the investment plan system 22 may access or initiate an application being executed by the investor computing system 28 and generate an indication or notification of the present lock-in condition and the reallocation plan that is prevented from being implemented. The investment plan system 22 may also provide a request for the investor to approve the reallocation plan in spite of the present lock-in condition. In some cases, the investment plan system 22 may also seek the input or approval of another individual that may have been previously defined by the investor. Upon receiving the requested approvals, the investment plan system 22 may implement the reallocation plan.

In other embodiments, after preventing the reallocation of funds at block 150, at block 152, the investment plan system 22 may receive a request to reallocate funds despite the lock-in condition. If the lock-in condition is still present, the investment plan system 22 may, at block 154, send information to the investor computing system 28 detailing one or more reasons as to why the reallocation of funds should not be implemented. As such, the investment computing system 22 may provide information related to historical financial trends that may be related to the current economic conditions and the potential benefits for not reallocating funds. Additionally, the investment plan system 22 may put the investor in contact with a financial specialist to help the investor understand the potential impacts of reallocating funds during a lock-in condition. Moreover, the investment plan system 22 may provide an estimated value of the currently allocated funds after a certain period of time and another estimated value of the funds if the reallocation were implemented.

With the foregoing in mind, it should be noted that one of the pitfalls in current investment models is the cyclical effect of market moves. Negative news generally triggers a sell-off that feeds to the bad news triggering more sell-off. The same cycle can be observed on the upside as well. These reactions coupled with automatic 'stop-loss' and 'limit' set on stocks triggers sell/buy causing huge swings in stock prices. This volatile movement within a short period might lead an investor to reallocate funds at a very inopportune moment, leading to heavy losses or minimal gains. In some cases, it also leads to huge gains. Based on the risk preferences of the investor, the plan settings can be configured to set the reaction to such market swings. For example, one configuration could be not to have any reallocations for first two hours after market start or last hour of market close. Based on investment allocations, another configuration could be to reallocate funds to conservative during high swing times, etc.

As discussed above, in certain situations, the investment plan system 22 and/or the independent system 36 may provide recommendations regarding the reallocation of funds. It should be noted that any entity providing advice on retirement account services may be obligated to provide information regarding potential conflicts of interests with respect to the recommendations. That is, if the financial institution associated with the investment plan system 22 or the independent system 36 receives any benefit (e.g., kick back, discount, etc.) for making certain investment recommendations of certain investment, the financial institution may be obligated to disclose the identified conflict of interest to the investor.

Figure 9:
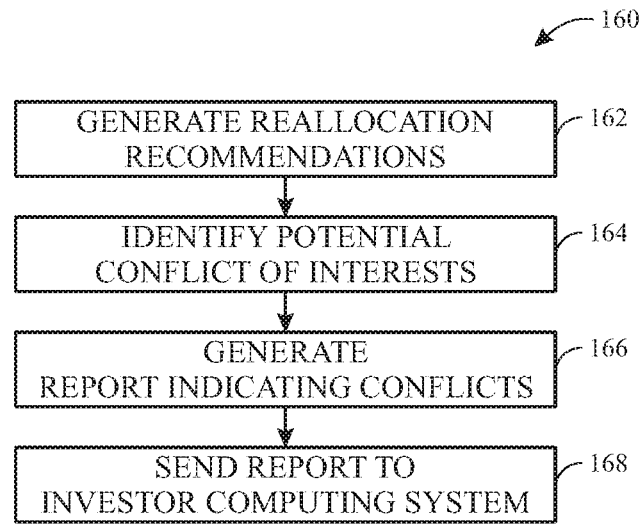
FIG. 9 illustrates a flow chart of a method for generating conflict of interests reports based on investment recommendations, in accordance with embodiments described herein.

With the foregoing in mind, FIG. 9 illustrates a flow chart of a method 160 for generating a report regarding potential conflicts of interest to the investor. Referring to FIG. 9, at block 162, the investment plan system 22 may generate allocation or reallocation recommendations according to the techniques described above.

At block 164, the investment plan system 22 may identify potential conflicts of interests associated with the generated allocation or reallocation plan. That is, the investment plan system 22 may review the allocation or reallocation plan and the investment instruments specified by the plan to identify potential conflicts of interests. In one embodiment, the conflicts of interests may be determined based on whether some financial benefit to an entity associated with the recommendation is received by including some investment instrument in the proposed plan.

After identifying the potential conflicts of interest, the investment plan system 22 may generate a report or document listing the potential conflicts of interest and the nature of the conflict. The report may thus indicate whether the investment plan system 22 or the financial institution associated with the investment plan system 22 receives some benefit based on the recommended plan. The report may also indicate whether the financial institution is affiliated or has a preferred business relationship with an investment instrument or another financial institution associated with a recommended investment instrument.

At block 168, the investment plan system 22 may send the report to the investor computing system 28. In one embodiment, the investment plan system 22 may initiate or execute an application stored in the investor computing system 28 and display the report.

In addition to generating the reports, the investment plan system 22 may also determine alternate allocation or reallocation plans other than the generated allocation plans. With this in mind, FIG. 10 illustrates a flow chart of the method 180 for sending alternate allocation or reallocation plans to the investor.

Figure 10:
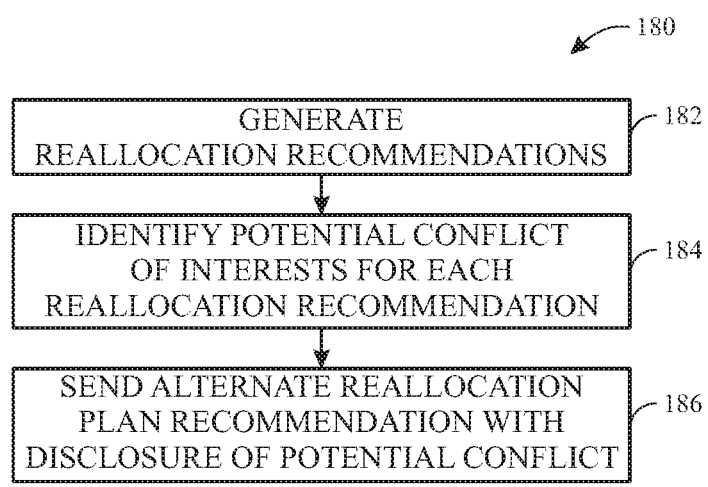
FIG. 10 illustrates a flow chart of a method for providing investment options in view of potential conflicts of interests associated with the investment options, in accordance with embodiments described herein.

Referring to FIG. 10, at blocks 182 and 184, the investment plan system 22 may generate allocation plan recommendations and identify potential conflicts of interests in the allocation plans as discussed above with respect to blocks 162 and 164 of FIG. 9. After identifying the conflicts of interests, at block 186, the investment plan system 22 may send alternate allocation plans that were generated by the investment plan system 22 or the independent system 36 and were decided against recommending. In addition to sending the alternate allocation plans, the investment plan system 22 may send a disclosure or details regarding potential conflicts of interests in the alternate plans. By disclosing the potential conflicts of interests in a number of allocation plans, the investor may be educated as to the benefits or disadvantages for each plan with the knowledge of the conflicts of interests. In one embodiment, after presenting the alternate plans, the investment plan system 22 may receive an input from the investor indicating a preferred allocation plan to implement.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a processor configured to:
receive investor data associated with a user, wherein the investor data comprises one or more investments held by the user;
receive an indication that one or more economy triggers exceed a threshold, wherein the one or more economy triggers correspond to one or more economical values, one or more economical indicators, or both;
determine a reallocation plan of the one or more investments based on the investor data in response to receiving the indication;
send a request to a computing device associated with the user that prompts a response for approval or denial to enable the processor to reallocate the investments according to the reallocation plan, wherein the request is configured to cause the computing device to display a prompt for approving or denying the reallocation plan via an electronic display, and wherein the prompt is configured to receive an input by the user via the electronic display;
track data representative of one or more performances of the one or more investments over a period of time as if reallocated per the reallocation plan in response to the input being indicative of the denial;
generate a first set of visualizations that corresponds to a reallocation balance of the one or more investments based on the data representative of the one or more performances, wherein the first set of visualizations is generated after the period of time expires, and wherein the reallocation balance is representative of the one or more investments reallocated per the reallocation plan after the period of time;
generate a second set of visualizations indicating a current balance of the one or more investments; and
send data representative the first set of visualizations and the second set of visualizations to the computing device, wherein an application stored in a memory of the computing device is configured to automatically execute in response to receiving the data representative of the first set of visualizations and the second set of visualizations, and wherein the application, when executing, is configured to automatically display the first set of visualizations and the second set of visualizations via the electronic display.

2. The system of claim 1, wherein the processor is configured to send the reallocation plan to an independent computing system associated with a different organization as compared to a first organization that determined the reallocation plan.

3. The system of claim 1, wherein the investor data comprises an age of the user, one or more desired investment risk levels selected by the user, one or more social attributes associated with the user, or any combination thereof.

4. The system of claim 1, wherein the processor is configured to:
determine an investment mode for the user based on the investor data; and
use the investment mode in determining the reallocation plan.

5. The system of claim 1, wherein the processor is configured to:
generate a third set of visualizations indicating an expected balance of the one or more investments after a second period of time as if the investments were reallocated according to the reallocation plan; and
send the third set of visualizations to the computing device, wherein the computing device is configured to display the third set of visualizations.

6. The system of claim 1, wherein the first set of visualizations comprises one or more bar graphs.

7. A method for tracking progress of one or more investments under an unimplemented reallocation plan, comprising:
receiving, via a processor, investor data associated with a user, wherein the investor data comprises the one or more investments held by the user;
receiving, via the processor, an indication that one or more economy triggers exceed a threshold, wherein the one or more economy triggers correspond to one or more economical values, one or more economical indicators, or both;
determining, via the processor, a reallocation plan of the one or more investments based on the investor data in response to receiving the indication;
sending, via the processor, a request to a computing device associated with the user, wherein the request is configured to prompt a response for approval or denial to enable the processor to reallocate the investments according to the reallocation plan, wherein the request is configured to cause the computing device to display a prompt for approving or denying the reallocation plan via an electronic display, and wherein the prompt is configured to receive an input by the user via the electronic display;
tracking, via the processor, data representative of one or more performances of the one or more investments over a period of time as if reallocated per the reallocation plan in response to the input being indicative of the denial;
generating, via the processor, a first set of visualizations that corresponds to a reallocation balance of the one or more investments based on the data representative of the one or more performances, wherein the first set of visualizations is generated after the period of time expires, and wherein the reallocation balance is representative of the one or more investments reallocated per the reallocation plan after the period of time;
generating, via the processor, a second set of visualizations indicating a current balance of the one or more investments; and
sending, via the processor, data representative the first set of visualizations and the second set of visualizations to the computing device, wherein an application stored in a memory of the computing device is configured to automatically execute in response to receiving the data representative of the first set of visualizations and the second set of visualizations, and wherein the application, when executing, is configured to automatically display the first set of visualizations and the second set of visualizations via the electronic display.

8. The method of claim 7, wherein the investor data comprises demographic information associated with the user, current financial status information associated with the user, employment information associated with the user, or any combination thereof.

9. The method of claim 7, wherein the reallocation plan of the one or more investments is determined based on the investor data and a mode of operation, and wherein the mode of operation comprises a savings services during accumulation mode, an allocation during accumulation mode, or an allocation during disbursement mode.

10. The method of claim 7, wherein the reallocation plan of the one or more investments is determined based on receiving, via the processor, an approval from an independent system.

11. The method of claim 7, comprising sending, via the processor, the first set of visualizations to the computing device using blockchain technology.

12. The method of claim 7, comprising sending, via the processor, the reallocation plan to the computing device using blockchain technology.

13. The method of claim 7, wherein the first set of visualizations comprises one or more graphs.

14. A non-transitory computer-readable medium comprising computer-executable instructions configured to cause a processor to:
   receive investor data associated with a user, wherein the investor data comprises one or more investments held by the user;
   receive an indication that one or more economy triggers exceed a threshold, wherein the one or more economy triggers correspond to one or more economical values, one or more economical indicators, or both;
   determine a reallocation plan of the one or more investments based on the investor data in response to receiving the indication;
   send a request to a computing device associated with the user, wherein the request is configured to prompt a response comprising an approval or a denial to enable the processor to reallocate the investments according to the reallocation plan, wherein the request is configured to cause the computing device to display a prompt for approving or denying the reallocation plan via an electronic display, and wherein the prompt is configured to receive an input by the user via the electronic display;
   track data representative of one or more performances of the one or more investments over a period of time as if reallocated per the reallocation plan in response to the input being indicative of the denial;
   generate a first set of visualizations that corresponds to a reallocation balance of the one or more investments based on the data representative of the one or more performances, wherein the first set of visualizations is generated after the period of time expires, and wherein the reallocation balance is representative of the one or more investments reallocated per the reallocation plan after the period of time;
   generate a second set of visualizations indicating a current balance of the one or more investments; and
   send data representative the first set of visualizations and the second set of visualizations to the computing device, wherein an application stored in a memory of the computing device is configured to automatically execute in response to receiving the data representative of the first set of visualizations and the second set of visualizations, and wherein the application, when executing, is configured to automatically display the first set of visualizations and the second set of visualizations via the electronic display.

15. The non-transitory computer-readable medium of claim 14, wherein the computer-executable instructions cause the processor to reallocate the one or more investments according to the reallocation plan based on the response being indicative of the approval.

16. The non-transitory computer-readable medium of claim 14, wherein the computer-executable instructions cause the processor to send the reallocation plan to the computing device using blockchain technology.

17. The non-transitory computer-readable medium of claim 14, wherein the computer-executable instructions cause the processor to:
   generate a third set of visualizations indicating an expected balance of the one or more investments after a second period of time as if the investments were reallocated according to the reallocation plan; and
   send the third set of visualizations to the computing device, wherein the computing device is configured to display the third set of visualizations.

18. The system of claim 1, wherein the one or more economical values, the one or more economical indicators, or both, represent a state of an economy of a nation, a state of an economy of a global region, a state of an economy of the world, a gross national product associated with a particular country, one or more stock market index values, one or more bond market index values, a price of gold, or a combination thereof.

19. The method of claim 7, wherein the one or more economical values, the one or more economical indicators, or both, represent a state of an economy of a nation, a state of an economy of a global region, a state of an economy of the world, a gross national product associated with a particular country, one or more stock market index values, one or more bond market index values, a price of gold, or a combination thereof.

20. The non-transitory computer-readable medium of claim 14, wherein the one or more economical values, the one or more economical indicators, or both, represent a state of an economy of a nation, a state of an economy of a global region, a state of an economy of the world, a gross national product associated with a particular country, one or more stock market index values, one or more bond market index values, a price of gold, or a combination thereof.

* * * * *